(12) United States Patent
Takahashi et al.

(10) Patent No.: US 10,554,107 B2
(45) Date of Patent: Feb. 4, 2020

(54) MANUFACTURING METHOD FOR ROTOR CORE AND MANUFACTURING METHOD FOR MOTOR CORE

(71) Applicant: TOYOTA JIDOSHA KABUSHIKI KAISHA, Toyota-shi, Aichi-ken (JP)

(72) Inventors: Toshimitsu Takahashi, Toyota (JP); Shigeto Takeuchi, Toyota (JP); Mayumi Takazawa, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 268 days.

(21) Appl. No.: 15/806,721

(22) Filed: Nov. 8, 2017

(65) Prior Publication Data
US 2018/0152087 A1    May 31, 2018

(30) Foreign Application Priority Data
Nov. 25, 2016    (JP) .................................. 2016-229199

(51) Int. Cl.
*H02K 15/12*    (2006.01)
*H02K 15/02*    (2006.01)

(52) U.S. Cl.
CPC ............. *H02K 15/12* (2013.01); *H02K 15/02* (2013.01); *H02K 15/024* (2013.01); *Y10T 29/49012* (2015.01)

(58) Field of Classification Search
CPC .... H02K 15/02; H02K 15/022; H02K 15/024; H02K 15/026; H02K 15/03; H02K 15/12; H02K 15/125; Y10T 29/49009; Y10T 29/49012; Y10T 29/49078
See application file for complete search history.

(56) References Cited

U.S. PATENT DOCUMENTS 7,845,065 B2 * 12/2010 Holmes .................... H02K 1/02
                                                                    29/419.2
2004/0135459 A1    7/2004 Koshiishi et al.
2014/0126894 A1    5/2014 Ohsugi et al.
(Continued)

FOREIGN PATENT DOCUMENTS

| CN | 103620926 A | 3/2014 |
| JP | 04268188 A | 9/1992 |
| JP | 05211749 A | 8/1993 |

(Continued)

*Primary Examiner* — Peter Dungba Vo
*Assistant Examiner* — Joshua D Anderson
(74) *Attorney, Agent, or Firm* — Sughrue Mion, PLLC

(57) ABSTRACT

A manufacturing method for a rotor core included in a rotor of a motor punches an electromagnetic steel sheet includes punching a plurality of plates for rotor core from an electromagnetic steel sheet; producing a rotor-core precursor by stacking up the plates for rotor core; manufacturing a rotor core by annealing an outer circumferential region of the rotor-core precursor at a first predetermined temperature, and annealing an inner circumferential region of the rotor-core precursor at a second predetermined temperature; the first predetermined temperature being a temperature at which grain growth of crystals of the electromagnetic steel sheet is promoted; and the second predetermined temperature being a temperature at which grain growth of the crystals of the electromagnetic steel sheet is not promoted.

8 Claims, 13 Drawing Sheets

(56) References Cited

U.S. PATENT DOCUMENTS

2016/0099635 A1  4/2016 Liang et al.

FOREIGN PATENT DOCUMENTS

| JP | 2004-270011 A | 9/2004 |
| JP | 2004328986 A | 11/2004 |
| JP | 2012-50200 A | 3/2012 |
| JP | 5228379 B2 | 3/2013 |
| JP | 2013-192417 A | 9/2013 |
| JP | 2015-126624 A | 7/2015 |
| JP | 2015122891 A | 7/2015 |
| JP | 2015126623 A | 7/2015 |

* cited by examiner

MANUFACTURING METHOD FOR ROTOR CORE AND MANUFACTURING METHOD FOR MOTOR CORE

INCORPORATION BY REFERENCE

The disclosure of Japanese Patent Application No. 2016-229199 filed on Nov. 25, 2016 including the specification, drawings and abstract is incorporated herein by reference in its entirety.

BACKGROUND

1. Technical Field

The present disclosure relates to a manufacturing method for a rotor core included in a motor, and a manufacturing method for a motor core including a rotor core and a stator core that are included in a motor.

2. Description of Related Art

In the automobile industry, aiming at further enhancement of driving performance of hybrid vehicles and electric vehicles, developments of higher output performance, weight reduction, and downsizing of drive motors have been promoted day after day. Household electric appliance manufactures have been knuckling down on further downsizing and higher performance of motors incorporated in various household electric appliances.

In order to enhance the motor performance, how much various losses caused inside motors can be reduced is a great issue. For example, after electricity is inputted, a copper loss resulting from a conductor resistance loss is caused in a coil composing a motor, and an iron loss (or a high-frequency iron loss) resulting from an eddy current loss or a hysteresis loss is caused to a rotor and a stator, so that the motor efficiency and the torque performance become deteriorated depending on these losses.

In manufacturing of a stator core and a rotor core, rotor-core plates and stator-core plates are obtained from an electromagnetic steel sheet by punching the electromagnetic steel sheet, multiple rotor-core plates are stacked up, and are then squeezed and/or welded together so as to produce a rotor core, and multiple stator-core plates are stacked up, and are then squeezed and/or welded together so as to manufacture a stator core.

In order to enhance magnetic characteristics by reducing the above iron losses in the stator core and the rotor core, there may be applied a method of annealing both the stator core and the rotor core at a predetermined temperature, while removing work strain introduced by pressing or the like, and/or a method of promoting grain growth of crystals forming the both cores, as with materials such as semi-process materials that are supposed to be annealed.

Unfortunately, it is known that there is a contradiction that the magnetic characteristics are enhanced by grain growth of the crystals in both the stator core and the rotor core through annealing, while strengths (tensile strengths) of the cores become deteriorated due to the grain growth of the crystals.

Reduction in iron loss of the stator core promotes downsizing and energy saving of the motor. In the meantime, the rotor core is a member rotating at such a high speed that a strong centrifugal force acts on this member during its rotation, and thus the rotor core is required to have a high strength strong enough to resist this strong external force. Therefore, annealing the rotor core becomes a factor of deterioration of strength, and thus it cannot be said that this method is a preferable method; therefore, a manufacturing method of annealing only a stator core without annealing a rotor core might be applied in some cases. However, a rotor core manufactured by this method cannot be expected to have the above-described enhancement of magnetic characteristics.

To cope with this, Japanese Patent Application Publication No. 2004-270011 discloses a manufacturing method for a non-oriented electrical steel sheet having a high magnetic flux density that is capable of simultaneously collecting rotor members and stator members from an identical steel sheet, while attaining a high magnetic flux density and a high strength in the rotor members as well as attaining a high magnetic flux density and a low iron loss in the stator members. Specifically, this method is a method that carries out hot-rolled steel annealing in such a manner that a crystal grain size becomes 50 µm or more to 500 µm or less in order to manufacture of a non-oriented electrical steel sheet having a high magnetic flux density whose steel-plate composition is specified at a predetermined mass ratio.

SUMMARY

In the manufacturing method disclosed in JP 2004-270011 A, since the non-oriented electrical steel sheet having a high magnetic flux density is subjected to the hot-rolled steel annealing, stator-core steel plates and rotor-core steel plates are both annealed. Hence, in the rotor-core steel plates, although enhancement of the magnetic characteristics can be expected, it is concerned that deterioration of strength thereof might be caused, as described above.

The present disclosure provides a manufacturing method for a rotor core capable of manufacturing a rotor core excellent in magnetic characteristics and having a high strength, and a manufacturing method for a motor core capable of manufacturing a stator core excellent in magnetic characteristics, in addition to the above rotor core.

A manufacturing method for a rotor core according to the present disclosure is a manufacturing method for a rotor core included in a rotor of a motor, and the manufacturing method includes: punching a plurality of plates for rotor core from an electromagnetic steel sheet; producing a rotor-core precursor by stacking up the plates for rotor core; manufacturing a rotor core by annealing an outer circumferential region of the rotor-core precursor at a first predetermined temperature, and annealing an inner circumferential region of the rotor-core precursor at a second predetermined temperature; the first predetermined temperature being a temperature at which grain growth of crystals of the electromagnetic steel sheet is promoted; and the second predetermined temperature being a temperature at which grain growth of the crystals of the electromagnetic steel sheet is not promoted.

The manufacturing method for the rotor core of the present disclosure is characterized by annealing the rotor-core precursor produced by stacking up the plurality of plates for rotor core formed of the electromagnetic steel sheet while providing a difference in temperature during the annealing between the outer circumferential region and the inner circumferential region of the rotor-core precursor so as to manufacture the rotor core. Specifically, the outer circumferential region is annealed at a temperature at which grain growth of the crystals of the electromagnetic steel sheet is promoted, and the inner circumferential region is annealed at a temperature at which grain growth of the crystals of the electromagnetic steel sheet is not promoted.

Here, in the rotor core in a circular shape in a plan view, the "outer circumferential region" denotes an outer circumferential annular region ranging from an outer circumferential contour in a circular shape to an inner region with a predetermined distance, or the like, and the "inner circumferential region" denotes a region at a center position excluding the outer circumferential region of the rotor core, or the like.

The outer circumferential region may be defined as a range where the iron loss is relatively great, that is, for example, a range approximately 5 mm more inward from the outer circumferential contour in a circular shape of the stator core. Here, the crystal grains in the outer circumferential region are allowed to grow so as to enhance the magnetic characteristics, to thereby effectively reduce the iron loss in the rotor core.

On the other hand, the inner circumferential region of the rotor core is a region where the crystal grains have not grown, so that this region has a higher strength (tensile strength), and by having this inner circumferential region, it is possible to ensure a high strength of the rotor core.

In another aspect of the manufacturing method for the rotor core according to the present disclosure, the second predetermined temperature may be a temperature at which work strain during the punching the plates for rotor core is removed.

During the punching process of the electromagnetic steel sheet, the work strain is introduced in the rotor-core plates; therefore, in the inner circumferential region, by annealing the inner circumferential region at the temperature at which grain growth of the crystals of the electromagnetic steel sheet is not promoted and also at the temperature at which the work strain introduced during the punching process is removed, it is possible to cope with deterioration of magnetic characteristics in the inner circumferential region due to the punching.

In another aspect of the manufacturing method for the rotor core according to the present disclosure, the manufacturing method for the rotor core may include: providing with insulating members on at least a top surface and a bottom surface of the rotor-core precursor; and placing and annealing the rotor-core precursor in an annealing furnace while a side surface of the rotor-core precursor, extending in a circumferential direction of the rotor-core precursor, is exposed.

In the state in which the insulating members are disposed on the top surface and the bottom surface of the rotor-core precursor and the side surface extending in the circumferential direction of the rotor-core precursor is exposed, for example, only the side surface of this rotor core is exposed to the outside. If the annealing is carried out in this state, the top and the bottom surfaces of the rotor core are protected by the insulating members, and thus only the side surface of the rotor core is directly heated so that the temperature thereof is increased, and the heat is gradually transferred from the side surface toward the inside of the rotor core.

By terminating the annealing at a stage where the outer circumferential region of the rotor-core precursor is annealed so that the temperature thereof becomes increased up to a predetermined temperature, it is possible to desirably promote grain growth of the crystals of the electromagnetic steel sheet in the outer circumferential region of the rotor-core precursor, and also possible to suppress grain growth of the crystals of the electromagnetic steel sheet in the inner circumferential region of the rotor-core precursor.

It should be noted that when the top and the bottom surfaces of the rotor-core precursor are covered by the insulating members, the entire top and the entire bottom surfaces of the rotor-core precursor may be covered by the insulating members, or only portions of the top and the bottom surfaces corresponding to the inner circumferential region of the rotor-core precursor may be covered by the insulating members.

In another aspect of the manufacturing method for the rotor core according to the present disclosure, the manufacturing method for the rotor may further include using an internally-movable annealing furnace. The internally-movable annealing furnace may have a space for movement where the rotor-core precursor rollingly moves. The internally-movable annealing furnace may include heating units disposed around the space for movement. The manufacturing method for the rotor may further include heating and annealing the rotor-core precursor from a side surface of the rotor-core precursor while the rotor-core precursor rollingly moves in the space for movement under operation of the heating units.

By using the internally-movable annealing furnace including the space for movement where the rotor-core precursor in a columnar shape rollingly moves, and heating and annealing the rotor-core precursor from the side surface thereof by the heating units while the rotor-core precursor is allowed to rollingly move, it is possible to efficiently anneal the outer circumferential region of the rotor-core precursor. As a method of allowing the rotor-core precursor to rollingly move, for example, such a method may be employed that an annular gear is fixed to the rotor-core precursor, and a long gear extending in the longitudinal direction in the space for movement and slidable in the space for movement is brought to mesh with the annular gear fixed to the rotor-core precursor, and this long gear is brought to slide so as to allow the rotor-core precursor to rollingly move in the space for movement.

There may be employed a method that consecutively arranges a pre-heating zone and a high-temperature heating zone in the internally-movable annealing furnace, pre-heats the entire rotor-core precursor up to a predetermined temperature during the rolling movement of the rotor-core precursor in the pre-heating zone maintained at a relatively low temperature, and subsequently actively anneals the rotor-core precursor from the side surface thereof during the rolling movement of the rotor-core precursor in the high-temperature heating zone, to thereby promote grain growing of the crystals in the outer circumferential region of the rotor-core precursor.

The present disclosure is also directed to a manufacturing method for a motor core including a rotor core included in a rotor and a stator core included in a stator, and the manufacturing method includes: punching a plurality of plates for rotor core and a plurality of plates for stator core plates from an electromagnetic steel sheet; producing a rotor-core precursor by stacking up the plates for the rotor core; producing a stator-core precursor by stacking up the plates for the stator core plates; manufacturing a rotor core by annealing an outer circumferential region of the rotor-core precursor at a first predetermined temperature and annealing an inner circumferential region of the rotor-core precursor at a second predetermined temperature so as to produce a rotor core; manufacturing a stator core by annealing the stator-core precursor; the first predetermined temperature being a temperature at which grain growth of crystals of the electromagnetic steel sheet is promoted; and the second predetermined temperature being a temperature at which grain growth of the crystals of the electromagnetic steel sheet is not promoted.

The manufacturing method for the motor core of the present disclosure is a method of manufacturing both the rotor core and the stator core (both are referred to collectively as a motor core) included in the motor, and is characterized by manufacturing the rotor core by a common method to the above-described manufacturing method for the rotor core.

By punching a common electromagnetic steel sheet so as to obtain the rotor-core plates and the stator-core plates from this electromagnetic steel sheet, it is possible to reduce a waste portion of the electromagnetic steel as little as possible, thus enhancing a yield rate of the materials.

In the second step, the entire stator-core precursor is annealed at a temperature at which the grain growth of the crystals is promoted so as to enhance the magnetic characteristics.

The rotor core manufactured by the manufacturing method of the present disclosure has excellent magnetic characteristics and a high strength, and the stator core manufactured by the same method also has excellent magnetic characteristics; thus these motor cores are used for manufacturing of motors having an excellent performance.

Further, in the manufacturing method for the motor core according to the present disclosure, as another aspect of the manufacturing method, the second predetermined temperature may be a temperature at which work strain during the punching the plates for rotor core and the plates for stator core is removed.

In the another aspect of the manufacturing method for the motor core according to the present disclosure, in the second step, the manufacturing method for the motor core may include providing with insulating members on at least a top surface and a bottom surface of the rotor-core precursor; and placing and annealing the rotor-core precursor and the stator-core precursor in the annealing furnace while a side surface of the rotor-core precursor, extending in a circumferential direction of the rotor-core precursor, is exposed.

For example, the rotor-core precursor is disposed inside the stator-core precursor, and these core precursors are both placed in the common annealing furnace so as to simultaneously anneal these both core precursors, to thereby efficiently carry out the annealing using the minimally small annealing furnace.

In another aspect of the manufacturing method for the motor core according to the present disclosure, the manufacturing method for the motor core may further include using an internally-movable annealing furnace. The internally-movable annealing furnace may have a space for movement where the rotor-core precursor rollingly moves. The internally-movable annealing furnace may include heating units disposed around the space for movement. The manufacturing method for the motor core may further include heating the rotor-core precursor from a side surface of the rotor-core precursor while the rotor-core precursor rollingly moves in the space for movement under operation of the heating units; and placing and annealing the stator-core precursor in a different annealing furnace.

While the rotor-core precursor is allowed to rollingly move in the space for movement in the internally-movable annealing furnace, the side surface of the rotor-core precursor is continuously and directly heated by the heating units disposed around the space for movement, to thereby efficiently anneal the rotor-core precursor from the side surface (the outer circumferential region) thereof. On the other hand, the stator-core precursor is placed in the different annealing furnace so as to be annealed such that the grain growth of the crystals is promoted through the entire stator-core precursor, to thereby produce a stator core excellent in magnetic characteristics.

As can be appreciated from the above description, according to the manufacturing method for the rotor core and the manufacturing method for the motor core according to the present disclosure, there is provided a difference in temperature during the annealing between the outer circumferential region and the inner circumferential region of the rotor-core precursor, the outer circumferential region is annealed at a temperature at which the grain growth of the crystals of the electromagnetic steel sheet is promoted, and the inner circumferential region is annealed at a temperature at which the grain growth of the crystals of the electromagnetic steel sheet is not promoted, to thereby manufacture the rotor core excellent in magnetic characteristics and having a high strength, thus also manufacturing the motor core including such a rotor core.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, with reference to drawings, a manufacturing method for a rotor core and a manufacturing method for a motor core of the present disclosure will be described.

Figure 1:
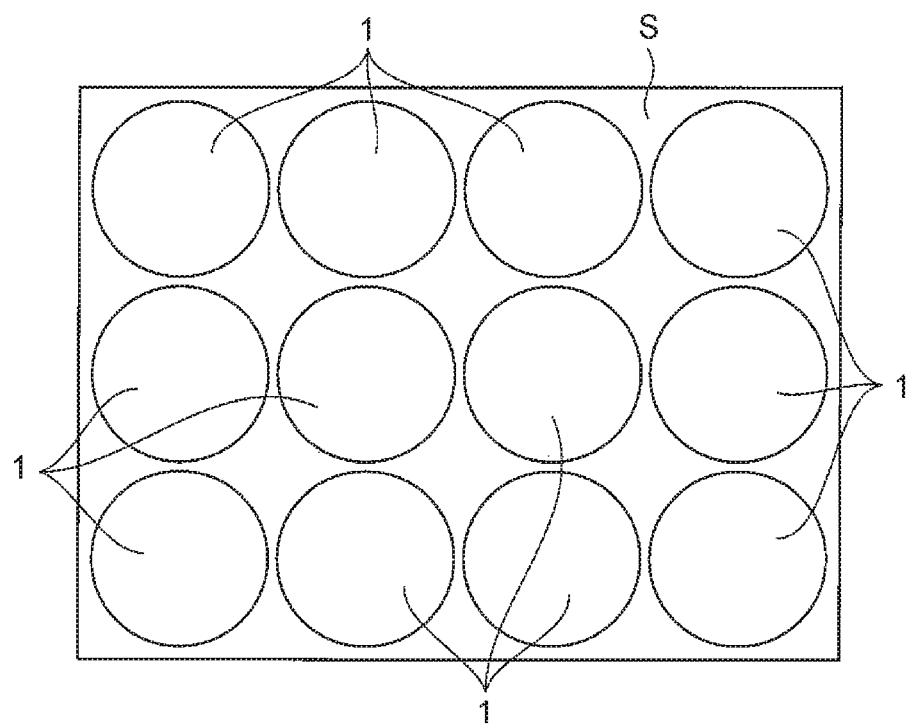
FIG. 1 is a schematic view explaining a first step of a manufacturing method for a rotor core of the present disclosure.
Figure 2:
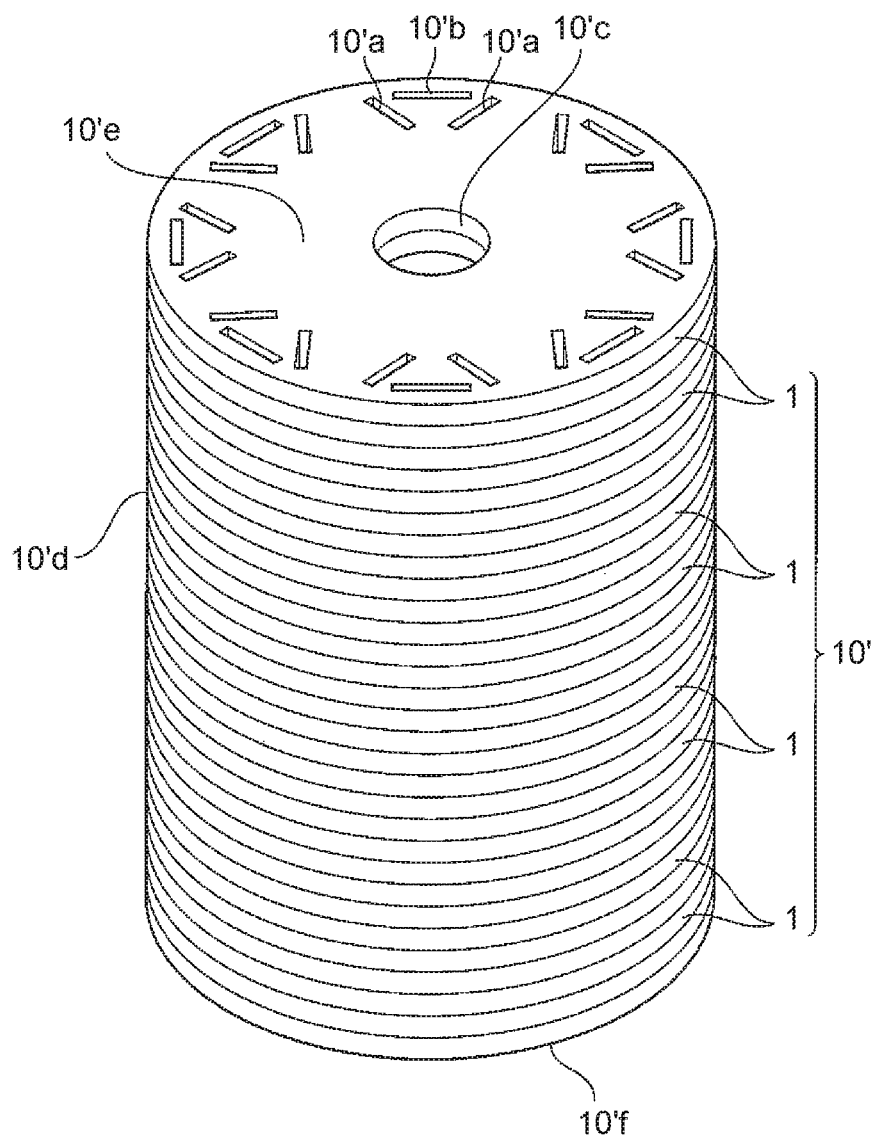
FIG. 2 is a schematic view explaining the first step of the manufacturing method, subsequent to FIG. 1.
Figure 3:
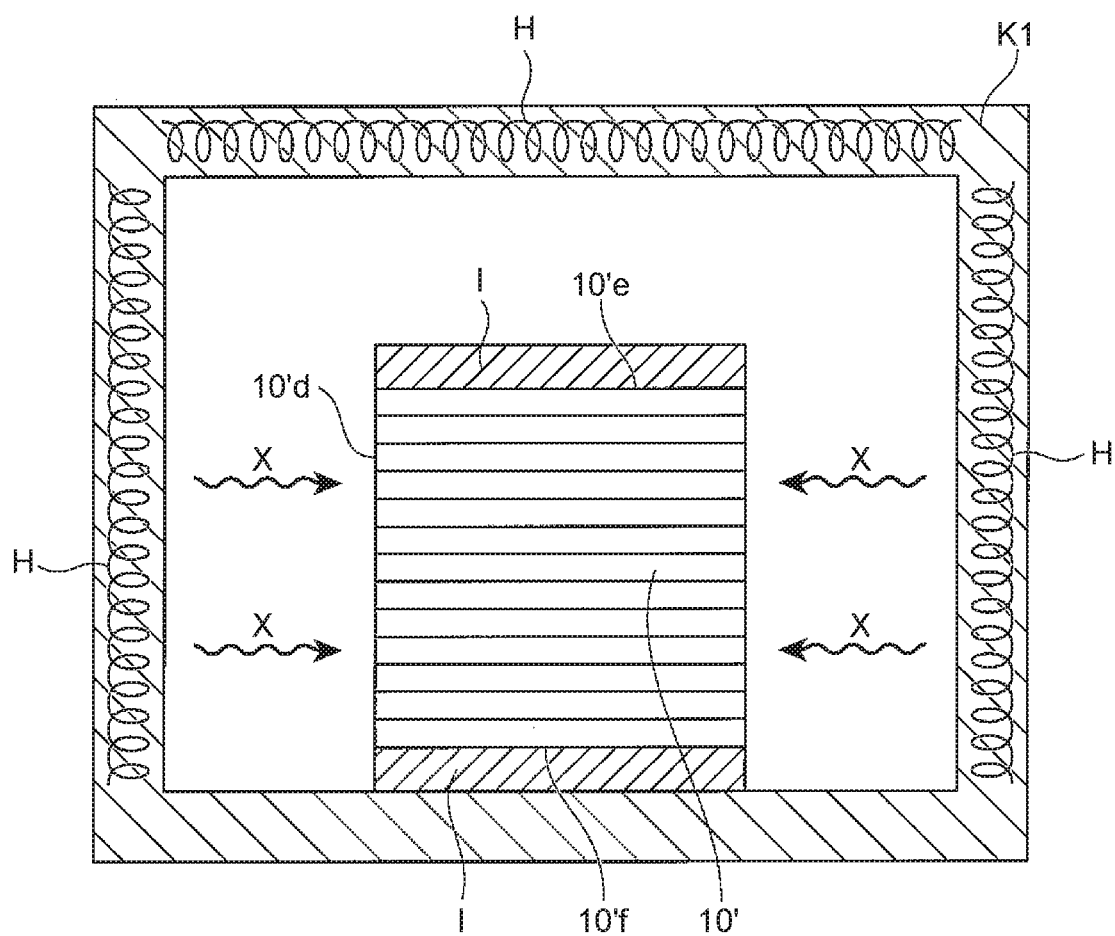
FIG. 3 is a schematic view explaining an embodiment 1 of a second step of the manufacturing method for the rotor core.
Figure 4:
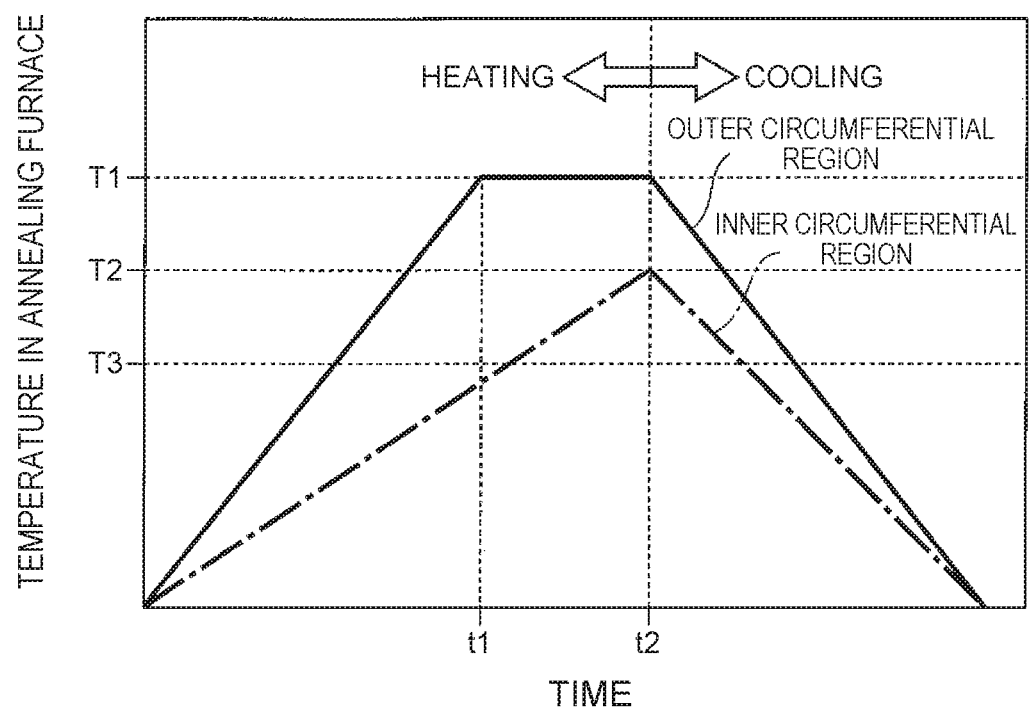
FIG. 4 is a view explaining heating control flows of an outer circumferential region and an inner circumferential region of a rotor-core precursor, during annealing.
Figure 5:
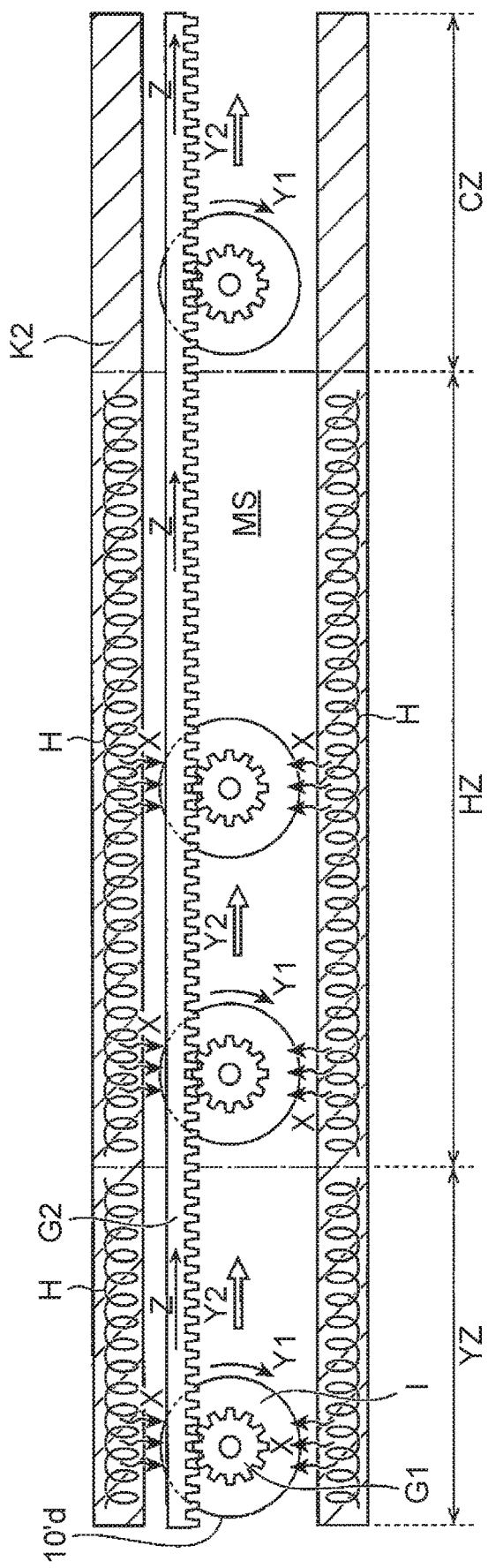
FIG. 5 is a schematic view explaining an embodiment 2 of the second step of the manufacturing method for the rotor core.

FIG. 1 and FIG. 2 are schematic views explaining a first step of the manufacturing method for a rotor core of the present disclosure in order, FIG. 3 is a schematic view explaining an embodiment 1 of a second step of the manufacturing method for the rotor core, and FIG. 4 is a view explaining heating control flows of an outer circumferential region and an inner circumferential region of a rotor-core precursor during annealing. FIG. 5 is a schematic view explaining an embodiment 2 of the second step of the manufacturing method for the rotor core.

As shown in FIG. 1, a broad electromagnetic steel sheet S is punched with a not-illustrated press machine or the like so as to produce multiple rotor-core plates 1, each formed in a disk shape having a predetermined diameter, from the electromagnetic steel sheet S. As an example of the electromagnetic steel sheet S, an electromagnetic steel sheet of a so-called fine grain material whose average grain size of crystals forming the electromagnetic steel sheet is within a range of approximately 20 to 30 μm may be applied, or an electromagnetic steel sheet of a so-called normal grain-size material whose average grain size of crystals is 50 μm or more may be applied.

Next, as shown in FIG. 2, the multiple produced rotor-core plates 1 are stacked up, and are squeezed and/or welded together, or the like so as to produce a rotor-core precursor 10'.

Here, the rotor-core precursor 10' has a columnar shape, and includes a side surface 10'$d$ extending in the circumferential direction, a top surface 10'$e$, a bottom surface 10'$f$. The rotor-core precursor 10' further includes magnet slots having the number corresponding to the number of magnetic poles; in an example illustrated in drawing, one magnet pole is composed of three permanent magnets not illustrated, and two magnet slots 10'$a$ in a substantially inverted V-shape in a plan view and a single magnet slot 10'$b$, a longitudinal direction of which is arranged in the circumferential direction between these magnet slots 10'$a$, are formed. However, there may be various manners of the magnet slots, such as a manner of composing a single magnetic pole by a permanent magnet disposed in a single magnet slot 10'$b$, and a manner of composing a single magnetic pole by permanent magnets disposed in two magnet slots 10'$a$ in a substantially inverted V-shape. In addition, a shaft slot 10'$c$ is formed at a center position of the rotor-core precursor 10'. These magnet slots 10'$a$, 10'$b$ and the shaft slot 10'$c$ may be formed in the rotor-core plates 1 before being stacked up, or may be so formed as to extend from the top surface 10'$e$ to the bottom surface 10'$f$ after the respective rotor-core plates 1 are stacked up (the above is a first step).

In the second step, the rotor-core precursor 10' produced in the first step is annealed at different temperatures respectively in the outer circumferential region thereof and in the inner circumferential region thereof so as to manufacture the rotor core. This second step will be described with reference to FIGS. 3, 4, 5.

First, the embodiment 1 of the second step will be described with reference to FIG. 3 and FIG. 4. As shown in FIG. 3, insulating members I are respectively placed on the top surface 10'$e$ and the bottom surface 10'$f$ of the rotor-core precursor 10', while the side surface 10'$d$ extending in the circumferential direction of the rotor-core precursor 10' is exposed to the outside, and the rotor-core precursor 10' in this state is placed in an annealing furnace K1 in which heating units H are incorporated.

The heating units H are operated so as to heat the rotor-core precursor 10' from the side surface 10'$d$ thereof (in directions X) in the annealing furnace K1.

Specifically, in the annealing furnace K1, heat input from the top surface 10'$e$ and the bottom surface 10'$f$ of the rotor-core precursor 10' is suppressed by the insulating members I, while heat input from the side surface 10'$d$ thereof exposed to the outside is actively carried out. Hence, in the rotor-core precursor 10', the annealing progresses from the side surface 10'$d$ thereof.

In this annealing process, the heating control flows of the outer circumferential region and the inner circumferential region of the rotor-core precursor shown in FIG. 4 are carried out.

In FIG. 4, a temperature T1 (a first predetermined temperature) indicates an upper limit value of a temperature range where grain growth of crystals forming the electromagnetic steel sheet is promoted; a temperature T2 (a second predetermined temperature) indicates an upper limit value of a temperature range where grain growth of the crystals thereof is not promoted; and a temperature T3 indicates a lower limit value of a temperature range where work strain introduced in the rotor-core plates 1 during the punching of the electromagnetic steel sheet S can be removed.

During the annealing process, the heating control is carried out in the outer circumferential region of the rotor-core precursor 10' such that the temperature of the outer circumferential region is increased up to the temperature T1 at time t1, and the outer circumferential region is annealed at the temperature T1 for a predetermined time period until time t2. On the other hand, the heating control is carried out in the inner circumferential region of the rotor-core precursor 10' such that the inner circumferential region is annealed while the temperature thereof is gradually increased up to the temperature T2 at the time t2. The heating is terminated at a stage of the time t2, and a cooling control to cool the annealing furnace K1 is carried out (the above is the embodiment 1 of the second step).

Here, the outer circumferential region of the rotor-core precursor 10' is a region supposed to have significant deterioration of magnetic characteristics due to an iron loss in the finished rotor core, and for example, an annular range 5 mm inward from the side surface 10'$d$ can be specified as the outer circumferential region. On the other hand, the inner circumferential region of the rotor-core precursor 10' is an inner region of the rotor-core precursor 10' excluding this outer circumferential region.

Next, the embodiment 2 of the second step will be described with reference to FIG. 5. In this embodiment, as shown in FIG. 5, there is used an internally-movable annealing furnace K2 provided with a space for movement MS where the rotor-core precursor 10' rollingly moves, and also provided with heating units H on the right and the left of the space for movement MS.

In the internally-movable annealing furnace K2, a pre-heating zone YZ, a high-temperature heating zone HZ, a cooling zone CZ are continuously arranged; and a long gear G2 slidable in the space for movement MS is also provided. The insulating members I are fixed to the top and the bottom surfaces of the rotor-core precursor 10', an annular gear G1 is fixed to one of the insulating members I, and the gear G1 and the gear G2 are brought to mesh with each other. The long gear G2 is brought to slide (in a direction Z) by a not-illustrated driving unit so as to allow the rotor-core precursor 10' to rollingly (in a direction Y1) travel (in a direction Y2) via the gear G1 from the pre-heating zone YZ, and the high-temperature heating zone HZ, to the cooling zone CZ in the space for movement MS. While the rotor-core precursor 10' is rollingly (in the direction Y1) moving (in the direction Y2) in the pre-heating zone YZ maintained at a relatively low temperature, the entire rotor-core precursor 10' is pre-heated up to a predetermined temperature. The rotor-core precursor 10' has a columnar shape, and only the side surface 10'd thereof is exposed toward the heating units H, so that the side surface 10'd of the rotor-core precursor 10' is directly heated (in the directions X), and thus the input heat progresses from the side surface 10'd of the rotor-core precursor 10'.

Next, the pre-heated rotor-core precursor 10' enters the high-temperature heating zone HZ. As the heating units H located in the high-temperature heating zone HZ, halogen heaters may be employed, for example, so as to carry out heating at a higher temperature than that in the pre-heating zone YZ. In the high-temperature heating zone HZ, a higher-temperature heat than that in the pre-heating zone YZ is inputted from the side surface 10'd of the rotor-core precursor 10' that is rollingly moving, so that the annealing in the outer circumferential region of the rotor-core precursor 10' progresses. After the rotor-core precursor 10' is annealed in the high-temperature heating zone HZ, the rotor-core precursor 10' moves into the cooling zone CZ so as to be cooled here. In the second step shown in FIG. 5, the heating control shown in FIG. 4 is also carried out (the above is the embodiment 2 of the second step).

As described above, the rotor core 10 shown in FIG. 6 is manufactured by the method according to the first step and the embodiment 1 or the embodiment 2 of the second step. Here, the rotor core 10 includes the magnet slots 10a, 10b and the shaft slot 10c, and also includes an outer circumferential region 10A where the crystals have grown in a predetermined width range w from a side surface 10d thereof, and an inner circumferential region 10B where the crystals have not grown, which is located inward of the outer circumferential region 10A.

In the outer circumferential region 10A, the magnetic characteristics become higher because the grain growth of the crystals is promoted, so that the iron loss can effectively be reduced. In addition, the inner circumferential region 10B is a region having a higher strength (tensile strength) because the grain growth of the crystals is not promoted. Accordingly, the rotor core 10 becomes a core excellent in magnetic characteristics and having a high strength.

Figure 7:
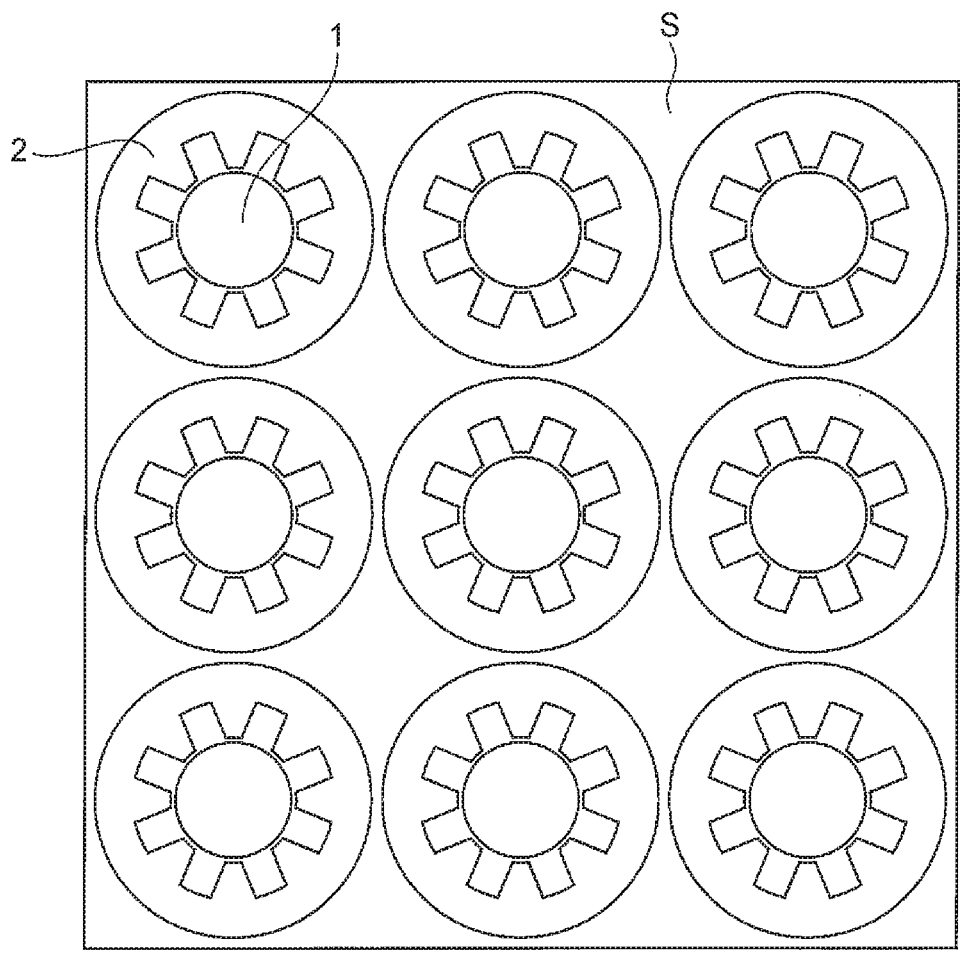
FIG. 7 is a schematic view explaining a first step of a manufacturing method for a motor core of the present disclosure.
Figure 8:
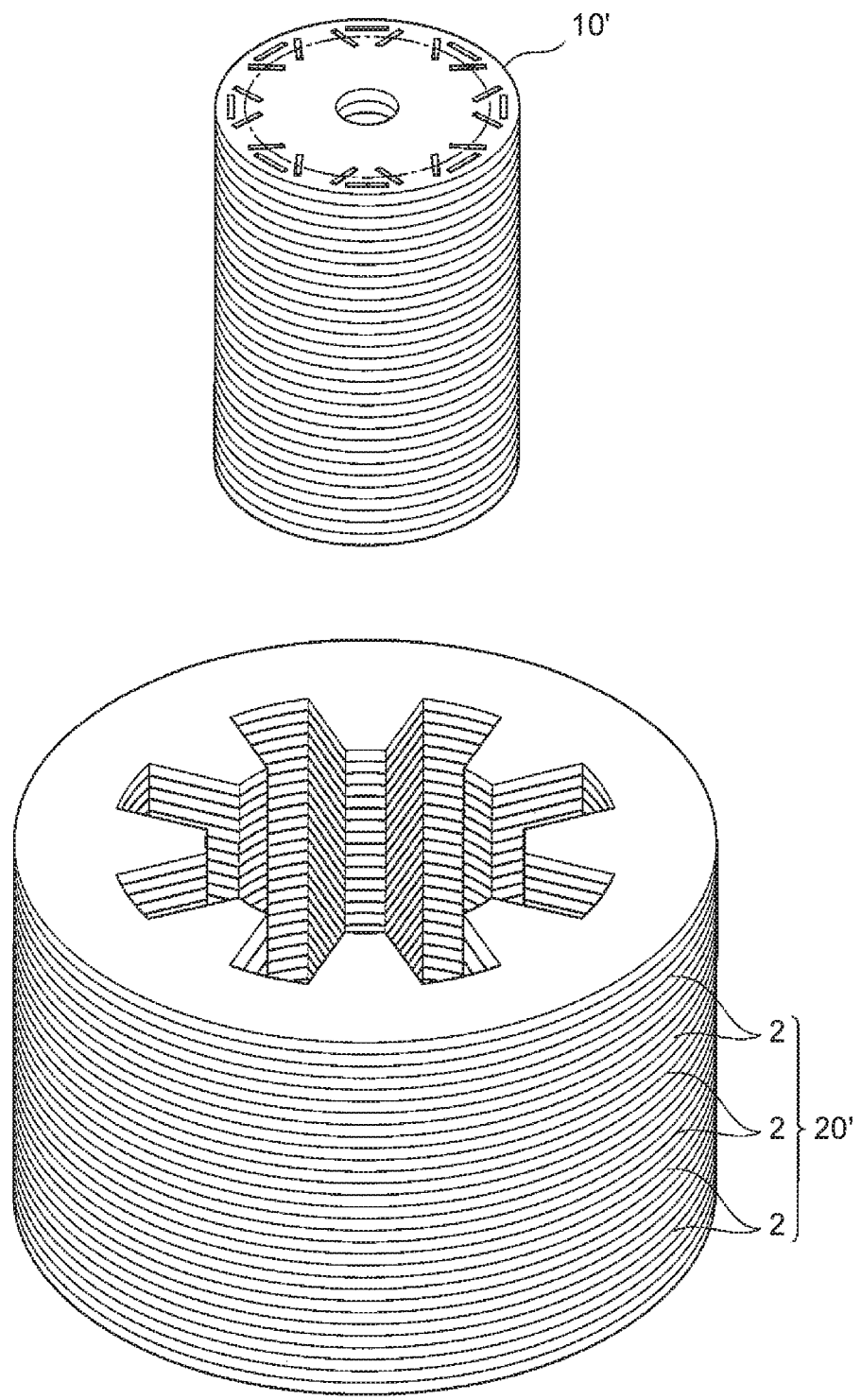
FIG. 8 is a schematic view explaining the first step of the manufacturing method, subsequent to FIG. 7.
Figure 9:
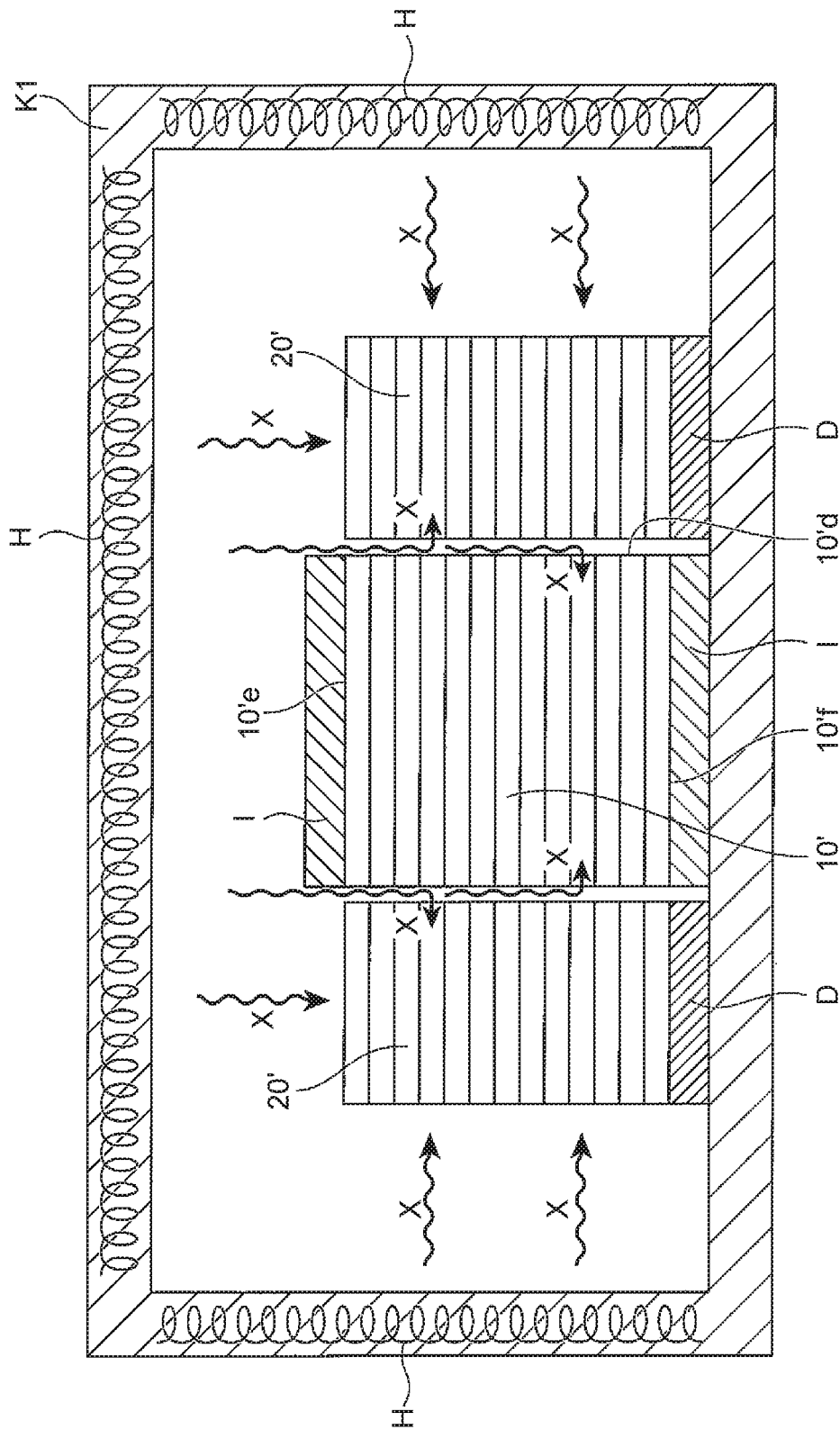
FIG. 9 is a schematic view explaining a second step of the manufacturing method for the motor core.
Figure 10:
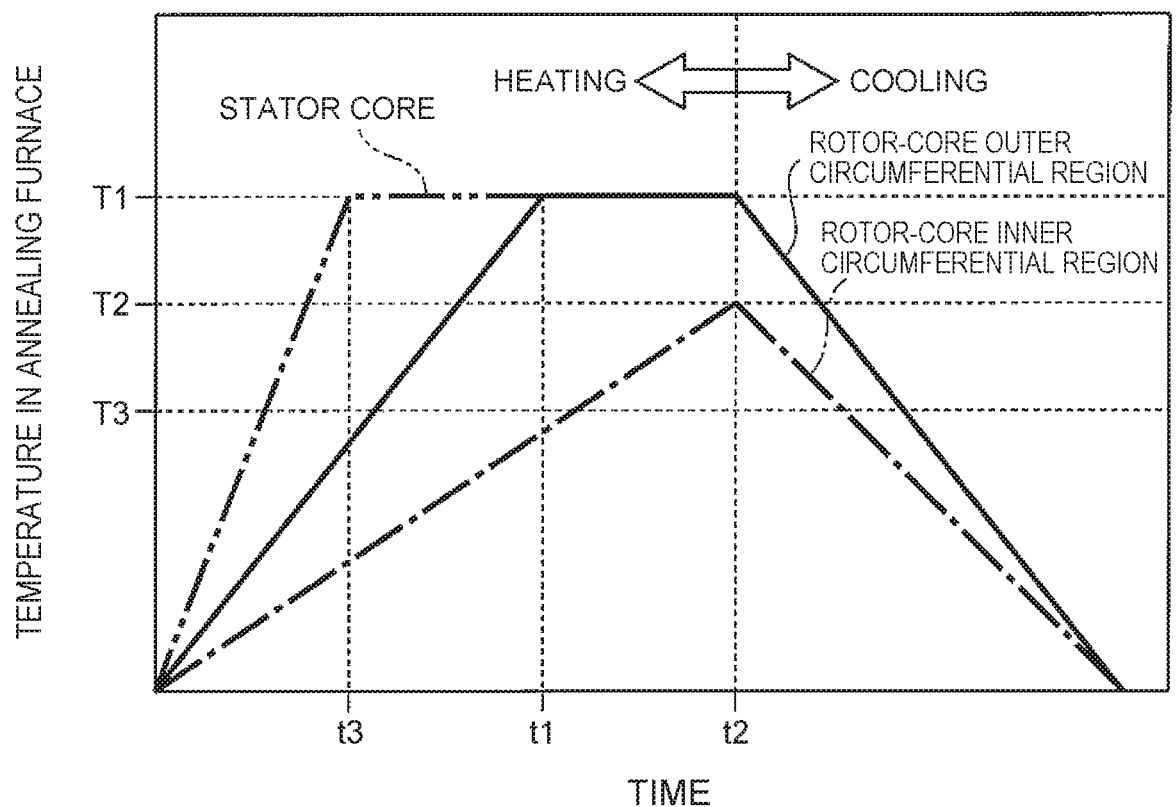
FIG. 10 is a view explaining heating control flows of a stator-core precursor, and the outer circumferential region and the inner circumferential region of the rotor-core precursor, during annealing.

FIGS. 7, 8 are schematic views explaining a first step of a manufacturing method for a motor core of the present disclosure in order; FIG. 9 is a schematic view explaining a second step of the manufacturing method for the motor core; and FIG. 10 is a view explaining heating control flows of the stator-core precursor, the outer circumferential region and the inner circumferential region of the rotor-core precursor during the annealing.

First, as shown in FIG. 7, the electromagnetic steel sheet S is punched to obtain multiple sets of stator-core plates 2 and rotor-core plates 1 from the electromagnetic steel sheet S, where each rotor-core plate 1 is obtained from an inner region of each corresponding stator-core plate 2 of the same single set, to thereby produce predetermined sets of the stator-core plates 2 and the rotor-core plates 1. In this manner, each stator-core plate 2 and each rotor-core plate 1 obtained from the inner region of each corresponding stator-core plate 2 are produced by punching the electromagnetic steel sheet S, to thereby reduce a waste portion of the electromagnetic steel S as little as possible, thus enhancing the yield rate of the materials.

Subsequently, as shown in FIG. 8, the multiple produced rotor-core plates 1 are stacked up, and are then squeezed and/or welded together, or the like so as to produce the rotor-core precursor 10'; and at the same time, the multiple produced stator-core plates 2 are stacked up, and are then squeezed and/or welded together, or the like so as to produce the stator-core precursor 20' (the above is the first step).

Next, as shown in FIG. 9, with respect to the rotor-core precursor 10', as similar to the case of FIG. 3, the insulating members I are disposed on the top surface 10'e and the bottom surface 10'f of the rotor-core precursor 10', and the rotor-core precursor 10' in a state of being disposed inside the stator-core precursors 20' is placed in the annealing furnace K1 in which the heating units H are incorporated. In this manner, since both the rotor-core precursors 10' and the stator-core precursors 20' are annealed at the same time with the rotor-core precursors 10' disposed inside the stator-core precursors 20', it is possible to design the annealing furnace K1 to be as small as possible, and also efficiently carry out the annealing.

In order to promote the annealing of the entire stator-core precursor 20', no insulating members are placed thereon. In order to adjust the heights of the rotor-core precursor 10' and the stator-core precursor 20' to each other, the stator-core precursor 20' is placed on a seat D.

In the annealing furnace K1, the heating units H are operated so as to heat the stator-core precursors 20' from the top surface and the side surface thereof (in the directions X), and also heat the rotor-core precursors 10' from the side surfaces 10'd thereof via a space between the rotor-core precursors 10' and the stator-core precursors 20' (in the directions X).

Accordingly, in the annealing furnace K1, the heat input from the top surface 10'e and the bottom surface 10'f of the rotor-core precursor 10' is suppressed by the insulating members I, while the heat input from the side surface 10'd exposed to the outside is actively carried out; and in the stator-core precursor 20', the heat input is actively carried out from the side surface and the top surface thereof exposed to the outside; therefore, the annealing progresses on the respective surfaces.

In this annealing process, there are carried out the heating control flows of the stator-core precursor, and of the outer circumferential region and the inner circumferential region of the rotor-core precursor shown in FIG. 10.

In FIG. 10, the temperature T1 indicates an upper limit value of a temperature range where grain growth of the crystals forming the electromagnetic steel sheet is promoted; the temperature T2 indicates an upper limit value of a temperature range where the grain growth of the crystals is not promoted; and the temperature T3 indicates a lower limit value of a temperature range where work strain introduced in the rotor-core plates 1 during the punching process of the electromagnetic steel sheet S can be removed.

During the annealing process, the heating control is carried out in the outer circumferential region of the rotor-core precursor 10' such that the temperature of the outer circumferential region is increased up to the temperature T1 at the time t1, and the outer circumferential region is annealed at the temperature T1 for a predetermined time period until the time t2; and the heating control is carried out in the inner circumferential region of the rotor-core precursor 10' such that the inner circumferential region is annealed while the temperature thereof is gradually increased up to the temperature T2 at the time t2. The heating control is carried out on the stator-core precursor 20' such that the temperature of the stator-core precursor 20' is increased up to the temperature T1 at the time t3 earlier than the time t1, and the stator-core precursor 20' is annealed at the temperature T1 for a predetermined time period until the time t2. Then, the heating is terminated at the stage of the time t2, and the control to cool the annealing furnace K1 is carried out (the above is the second step).

Figure 11:
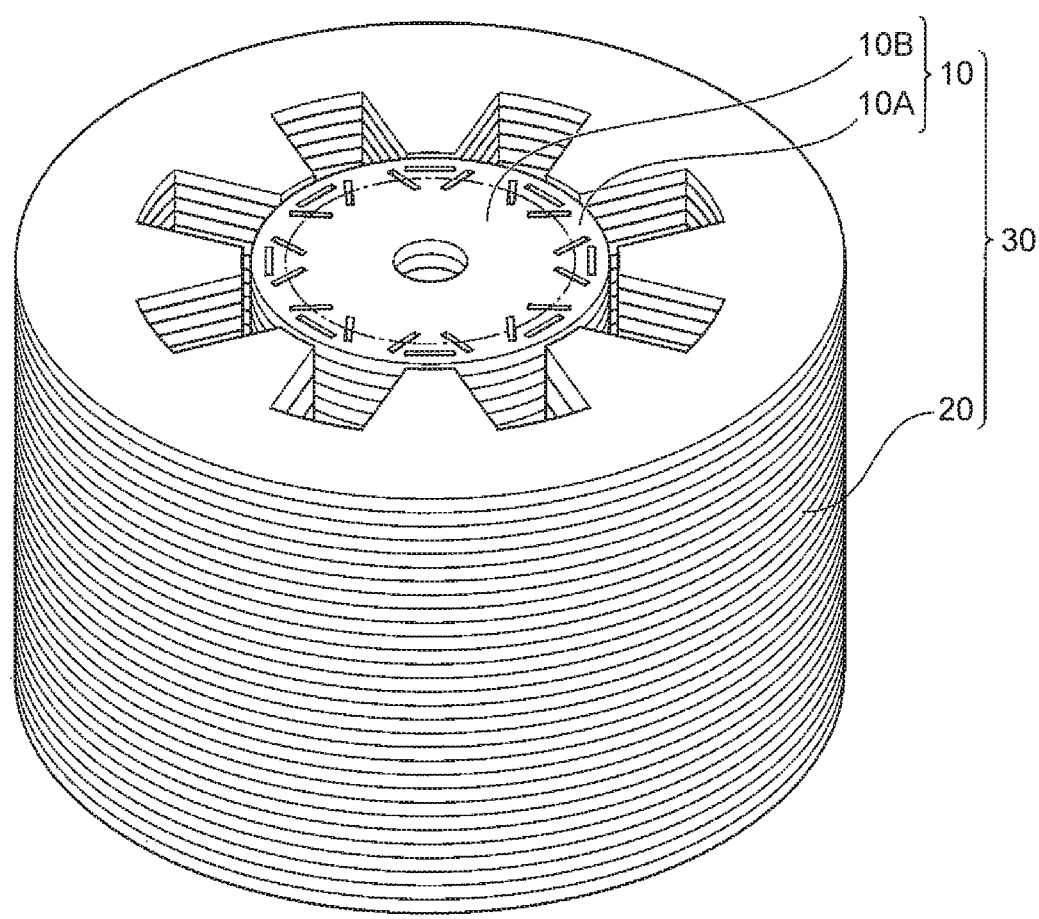
FIG. 11 is a perspective view of a manufactured motor core.

As described above, by the manufacturing method according to the first step and the second step, a motor core 30 composed of the rotor core 10 and the stator core 20 is manufactured, as shown in FIG. 11.

Figure 6:
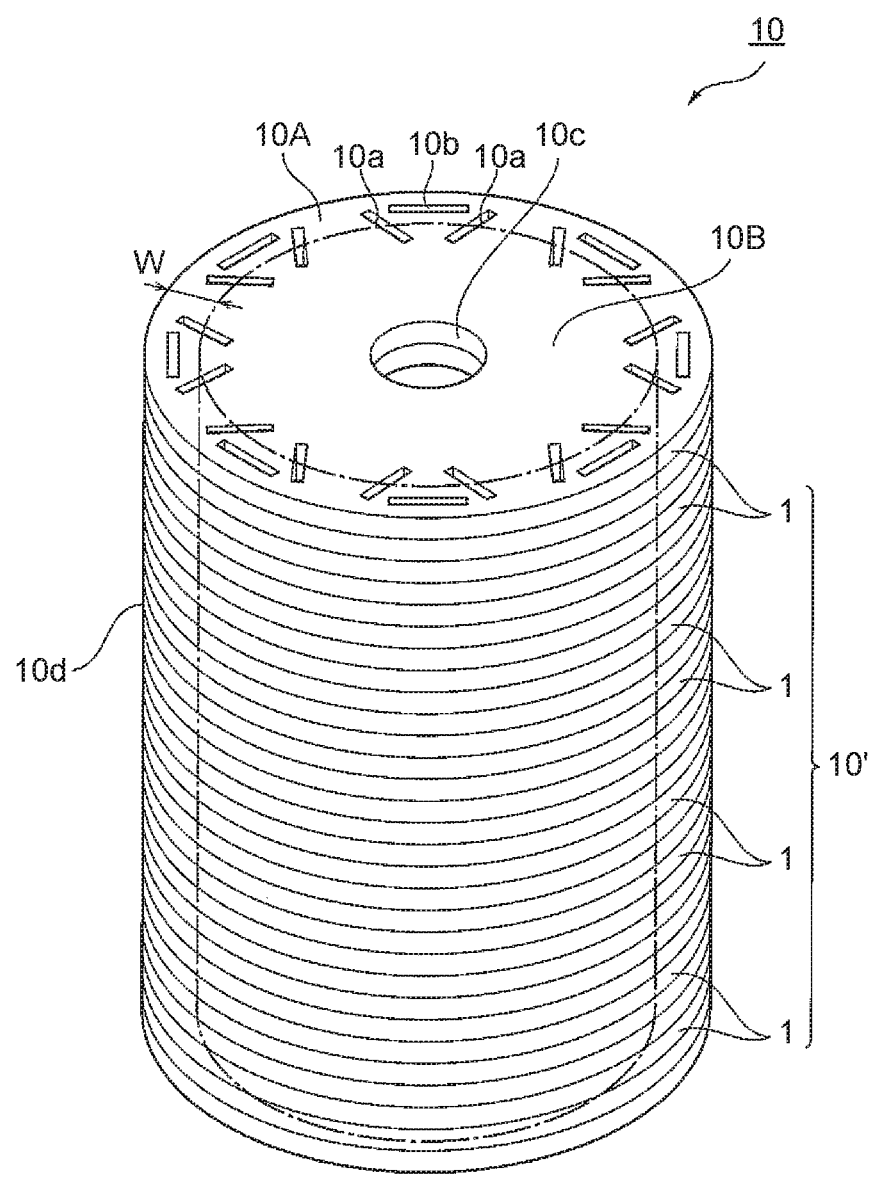
FIG. 6 is a perspective view of a manufactured rotor core.

Here, as shown in FIG. 6, the rotor core 10 includes the magnet slots 10a, 10b and the shaft slot 10c, and also includes the outer circumferential region 10A where the crystal grains have grown in the predetermined width range w from the side surface 10d, and the inner circumferential region 10B where the crystal grains have not grown, which is located inward of the outer circumferential region 10A. This outer circumferential region 10A provides high magnetic characteristics, and the inner circumferential region 10B ensures a high strength.

In the meantime, the stator core 20 has higher magnetic characteristics because the crystal grains have grown through the entire stator core 20, so that the stator core 20 becomes a core whose iron loss is reduced.

Accordingly, it is possible to manufacture the rotor core 10 excellent in magnetic characteristics and having a high strength; and furthermore, it is also possible to manufacture the stator core 20 excellent in magnetic characteristics.

Also in the second step of the manufacturing method for this motor core, there may also be employed a method of using the internally-movable annealing furnace K2 shown in FIG. 5 when the rotor-core precursors 10' is annealed, and using the annealing furnace K1 shown in FIG. 9 when the stator-core precursor 20' is annealed.

In order to estimate respective characteristics of a test body of a rotor core produced by the manufacturing method of the present disclosure (an embodiment example), of a test body of a rotor core without being subjected to the annealing (a comparative example 1), of a test body of a rotor core entirely annealed at 750° C. (a comparative example 2), and of a test body of a rotor core entirely annealed at 850° C. (a comparative example 3), the present inventors and others conducted such an experiment that test specimens were cut out from a steel sheet of a raw material, and the test specimens were subjected to the same heating treatment as those of the rotor cores. The test body of the embodiment example was made by simulating a rotor core having a diameter of 150 mm in a plan view wherein an annular range of 5 mm from the outer circumference thereof is defined as the outer circumferential region, and a region inward of the outer circumferential region is defined as the inner circumferential region, the outer circumferential region was annealed at 800 to 850° C., and the inner circumferential region was annealed at 650 to 750° C. Each of the test bodies was made by using rotor-core plates obtained by punching an electromagnetic steel sheet, which was a fine grain material having an average grain size of less than 50 μm. Here, it is understood that the grain growth of the crystals in the electromagnetic steel sheet is not promoted within the temperature range of 750° C. or less, and work strain introduced during the punching process is removed within the temperature range of 650° C. or more. In the present experiment, with respect to the strengths of the test bodies, tensile test specimens were produced from fine grain materials having different annealing temperatures, and yield strengths of the respective test specimens were measured when a tensile test was carried out by using a tensile tester. Similarly, an iron loss test was conducted by measuring iron losses of test specimens cut out from the fine grain materials having the different annealing temperatures.

Figure 12:
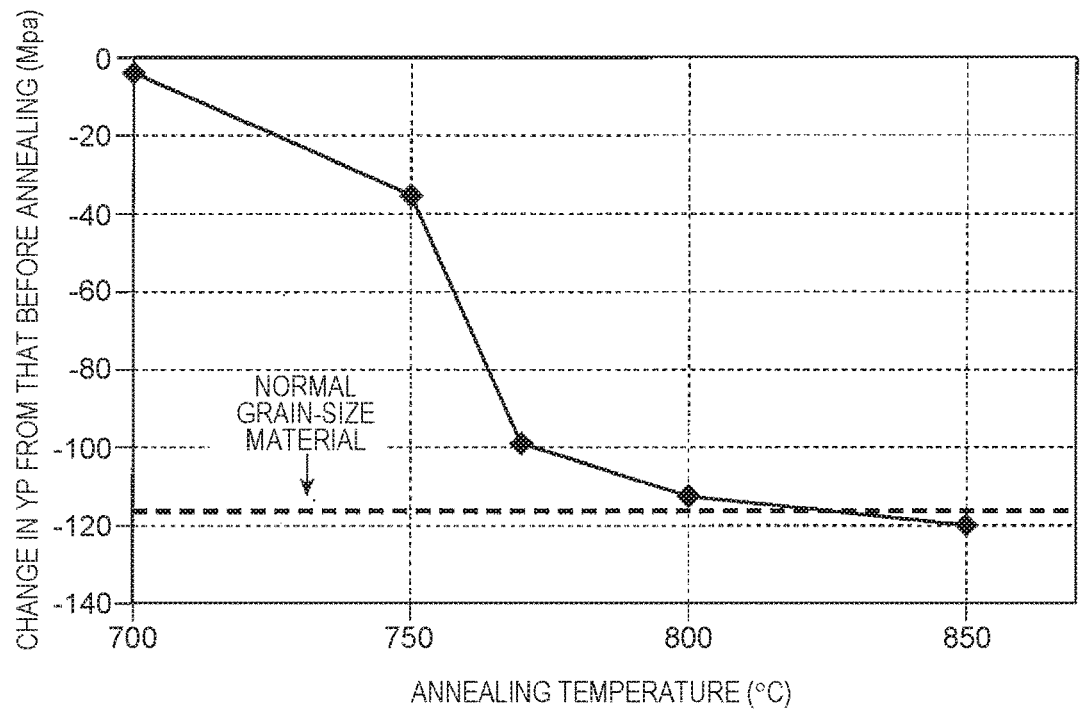
FIG. 12 is a view showing experiment results identifying a relation between annealing temperatures and strengths of rotor cores after annealing.
Figure 13:
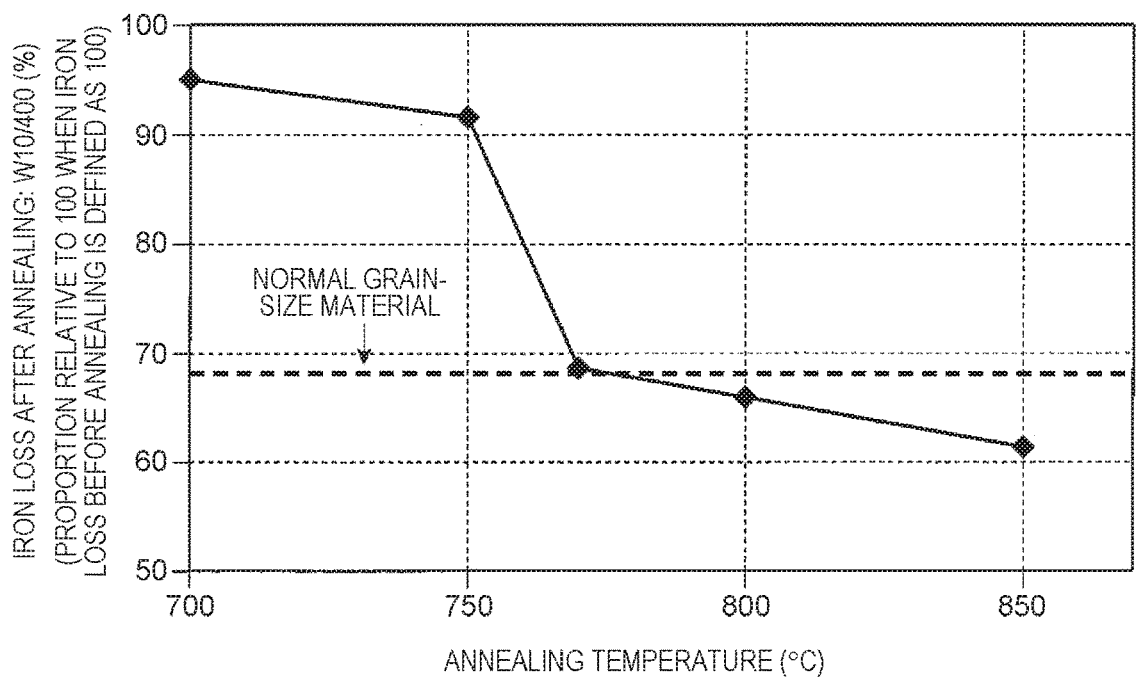
FIG. 13 is a view showing experiment results identifying a relation between annealing temperatures and iron losses of the rotor cores after the annealing.

In the present experiment, the strengths and the iron losses of the above embodiment example and the comparative examples 1 to 3 were verified, and there was conducted a test in which rotor-core precursors were produced, and these rotor-core precursors were annealed at various annealing temperatures, and yield strengths and iron losses of the respective materials after being annealed at the various annealing temperatures were measured. FIG. 12 shows test results regarding the annealing temperatures and the yield strengths (Yp) of the respective materials, and FIG. 13 shows test results regarding the annealing temperatures and the iron losses of the respective rotor cores. Numerical values on the vertical axis of FIG. 12 indicate decrease in the yield strengths of the respective rotor cores formed of a fine grain material, from yield strengths thereof before the annealing to yield strengths thereof after the annealing. A strength indicated by a broken line in FIG. 12 indicates a yield strength of a normal grain-size material. Numerical values on the vertical axis of FIG. 13 indicate iron losses of the respective rotor cores formed of the fine grain material after the annealing in terms of proportions relative to 100 when an iron loss result of each rotor core formed of the fine grain material before the annealing is defined to be 100.

As shown in FIG. 12, it is verified that the strength of each rotor core after the annealing greatly changes from the annealing temperature 750° C., more specifically, it is verified that the strength of each rotor core greatly drops in the annealing temperature range of 750° C. or more. Accordingly, if focusing on only the strength of the rotor core, it is preferable to adjust the annealing temperature to be lower than 750° C.

Here, a range to which the embodiment example is applied is shown in the drawing. In the rotor core according to the embodiment example, the outer circumferential region thereof is annealed at 800 to 850° C., and the inner circumferential region thereof is annealed at 650 to 750° C. In the rotor core according to the embodiment example, a difference in annealing temperature is provided between the outer circumferential region and the inner circumferential region, and the inner circumferential region is annealed at a temperature lower than the 750° C., to thereby ensure a high strength of the rotor core.

As shown in FIG. 13, it is verified that the iron loss of each rotor core after the annealing greatly changes from the annealing temperature of 750° C., more specifically, the iron loss of each rotor core greatly drops in the annealing temperature range of 750° C. or more. Accordingly, if focusing on only the iron loss of the rotor core, it is preferable to adjust the annealing temperature to be higher than 750° C.

In the rotor core according to the embodiment example, a difference in annealing temperature is provided between the outer circumferential region and the inner circumferential region, and the outer circumferential region is annealed at a temperature higher than 750° C., to thereby ensure excellent magnetic characteristics having a high iron-loss reduction effect.

Figure 14:
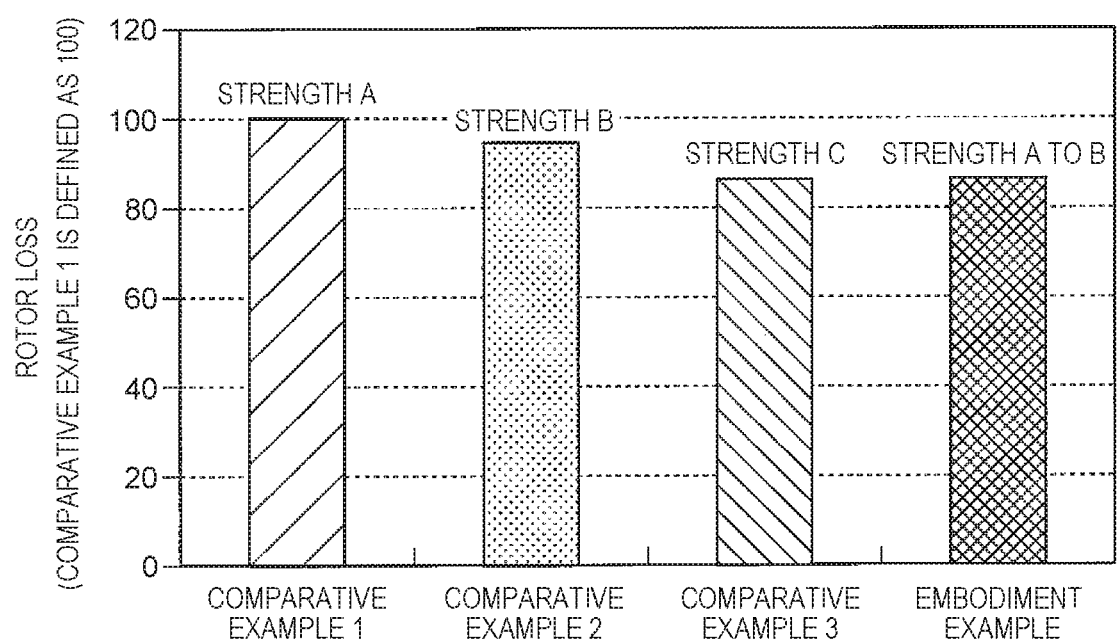
FIG. 14 is a view showing experiment results regarding iron losses and strengths of an embodiment example and comparative examples.

FIG. 14 is a view showing test results regarding iron losses and strengths of respective rotors of the embodiment example and the comparative examples 1 to 3. In this drawing, a strength A indicates that decrease of the yield strength from that before the annealing in FIG. 12 is approximately 0 MPa to 20 MPa, and a strength B indicates approximately 20 MPa to 40 MPa, and a strength C indicates more than 40 MPa, respectively.

As shown in FIG. 14, it is verified that the comparative example 3 and the embodiment example both of which were entirely annealed at 850° C. exhibit significant decrease in iron loss to the same extent (approximately 87) if the comparative example 1 is defined to be 100; and it is seen that with respect to the strength, the embodiment example has a strength substantially the same as that of the comparative example 1 that was not annealed. That is, it is verified that with the manufacturing method of the present disclosure that carries out the annealing the outer circumferential region and the inner circumferential region using the different annealing temperatures, it is possible to obtain the rotor core excellent in magnetic characteristics and having a high strength.

As described above, the embodiments of the present disclosure have been described in detail with reference to the drawings, but specific configurations are not limited to the embodiments, and design changes and the like which are made within a range not departing from the scope of the disclosure are included in the disclosure.

What is claimed is:

1. A manufacturing method for a rotor core included in a rotor of a motor, the manufacturing method for the rotor core comprising:
    punching a plurality of plates for the rotor core from an electromagnetic steel sheet;
    producing a rotor-core precursor by stacking up the plates for the rotor core, the rotor-core precursor having an outer circumferential region ranging from an outer circumferential contour of the rotor-core precursor having a circular shape to an inner region a predetermined distance from the outer circumferential contour and an inner circumferential region ranging from a center of the rotor-core precursor to the inner region at the predetermined distance from the outer circumferential contour;
    manufacturing a rotor core by annealing the outer circumferential region of the rotor-core precursor at a first predetermined temperature, and annealing the inner circumferential region of the rotor-core precursor at a second predetermined temperature;
    the first predetermined temperature being a temperature at which grain growth of crystals of the electromagnetic steel sheet is promoted; and the second predetermined temperature being a temperature lower than the first predetermined temperature at which grain growth of the crystals of the electromagnetic steel sheet is not promoted.

2. The manufacturing method for the rotor core according to claim 1, wherein
    the second predetermined temperature is a temperature at which work strain during the punching the plates for the rotor core is removed.

3. The manufacturing method for the rotor core according to claim 1, further comprising:
    providing insulating members on at least a top surface and a bottom surface of the rotor-core precursor; and
    placing and annealing the rotor-core precursor in an annealing furnace while a side surface of the rotor-core precursor, extending in a circumferential direction of the rotor-core precursor, is exposed.

4. The manufacturing method for the rotor core according to claim 1, further comprising:
    using an internally-movable annealing furnace, the internally-movable annealing furnace having a space for movement where the rotor-core precursor rollingly moves, the internally-movable annealing furnace including heating units disposed around the space for movement; and
    heating and annealing the rotor-core precursor from a side surface of the rotor-core precursor while the rotor-core precursor rollingly moves in the space for movement under operation of the heating units.

5. A manufacturing method for a motor core including a rotor core included in a rotor core and a stator core included in a stator, the manufacturing method for the motor core comprising:
    punching a plurality of plates for the rotor core and a plurality of plates for the stator core from an electromagnetic steel sheet;
    producing a rotor-core precursor by stacking up the plates for the rotor core the rotor-core precursor having an outer circumferential region ranging from an outer circumferential contour of the rotor-core precursor having a circular shape to an inner region a predetermined distance from the outer circumferential contour and an inner circumferential region ranging from a center of the rotor-core precursor to the inner region at the predetermined distance from the outer circumferential contour;
    producing a stator-core precursor by stacking up the plates for the stator core;
    manufacturing a rotor core by annealing the outer circumferential region of the rotor-core precursor at a first predetermined temperature and annealing the inner circumferential region of the rotor-core precursor at a second predetermined temperature so as to produce a rotor core;
    manufacturing a stator core by annealing the stator-core precursor;
    the first predetermined temperature being a temperature at which grain growth of crystals of the electromagnetic steel sheet is promoted; and the second predetermined temperature being a temperature lower than the first predetermined temperature at which grain growth of the crystals of the electromagnetic steel sheet is not promoted.

6. The manufacturing method for the motor core according to claim 5, wherein
    the second predetermined temperature is a temperature at which work strain during the punching the plates for the rotor core and the plates for the stator core is removed.

7. The manufacturing method for the motor core according to claim 5, further comprising:
    providing insulating members on at least a top surface and a bottom surface of the rotor-core precursor; and
    placing and annealing the rotor-core precursor and the stator-core precursor in the annealing furnace while a side surface of the rotor-core precursor, extending in a circumferential direction of the rotor-core precursor, is exposed.

8. The manufacturing method for the motor core according to claim 5, further comprising:
    using an internally-movable annealing furnace, the internally-movable annealing furnace having a space for movement where the rotor-core precursor rollingly moves, the internally-movable annealing furnace including heating units disposed around the space for movement;
    heating the rotor-core precursor from a side surface of the rotor-core precursor while the rotor-core precursor rollingly moves in the space for movement under operation of the heating units; and placing and annealing the stator-core precursor in a different annealing furnace.

\* \* \* \* \*